US00RE34781E

United States Patent [19]

Spalink et al.

[11] E Patent Number: Re. 34,781

[45] Reissued Date of Patent: Nov. 8, 1994

[54] COUPLING ADAPTER

[75] Inventors: Robert D. Spalink, Grand Rapids, Mich.; Steven M. Knowles, Woodburn, Ind.; John T. Kosztowny, Dearborn, Mich.

[73] Assignee: Aeroquip Corporation, Maumee, Ohio

[21] Appl. No.: 867,263

[22] Filed: Apr. 10, 1992

Related U.S. Patent Documents

Reissue of:

[64] Patent No.: 4,921,013
Issued: May 1, 1990
Appl. No.: 396,323
Filed: Aug. 21, 1989

[51] Int. Cl.[5] ..... F16L 37/28
[52] U.S. Cl. ..... 137/614.05; 137/614.01
[58] Field of Search ..... 137/614.05, 614.01, 137/614.04, 614.06

[56] References Cited

U.S. PATENT DOCUMENTS

| | | | |
|---|---|---|---|
| 104,025 | 6/1870 | Harvey | 137/614.05 |
| 2,473,223 | 6/1949 | Scheiwer | 137/614.06 |
| 2,543,589 | 2/1951 | Newcomb | 137/614.06 |
| 2,696,993 | 12/1954 | Buckler | 137/614.06 |
| 2,739,612 | 3/1956 | Hansen | 137/614.05 |
| 3,295,584 | 1/1967 | Proctor | 251/89.5 |
| 3,424,181 | 10/1969 | Morse | 137/68 |
| 3,731,705 | 5/1973 | Butler | 137/614.06 |
| 3,840,967 | 9/1974 | Olson | 29/213 |
| 3,874,411 | 4/1975 | Vik | 137/614.06 |
| 3,916,641 | 11/1975 | Mullins | 141/348 |
| 3,935,713 | 4/1976 | Olson | 62/77 |
| 4,069,686 | 2/1978 | Hoelman | 137/322 |
| 4,078,578 | 3/1978 | Buchholtz | 137/614 |
| 4,181,150 | 1/1980 | Maldavs | 137/614.06 |
| 4,182,370 | 10/1980 | Karcher | 137/614.04 |
| 4,222,411 | 9/1980 | Herzan et al. | 137/614.06 |
| 4,303,098 | 12/1981 | Shindelar | 137/614.06 |
| 4,476,892 | 6/1984 | Boyce | 137/322 |
| 4,582,295 | 4/1986 | Kugler et al. | 251/149.9 |
| 4,583,711 | 4/1986 | Johnson | 137/614 |
| 4,805,417 | 7/1989 | Weaver et al. | 141/302 |
| 4,892,117 | 11/1990 | Spalink et al. | 137/614.03 |

FOREIGN PATENT DOCUMENTS

| | | | |
|---|---|---|---|
| 3655 | of 1884 | United Kingdom | 137/614.05 |

*Primary Examiner*—A. Michael Chambers
*Attorney, Agent, or Firm*—Emch, Schaffer, Schaub & Porcello Co.

[57] ABSTRACT

The invention pertains to a coupling adapter for use with self-sealing valved coupling parts of the axially movable type for servicing and testing a fluid circuit. The adapter consists of a tubular body having a coupling end for connecting to the associated part and an axial passage wherein a threaded valve actuator is located having a free end adapted to releasably engage and displace the associated part's valve. A torque appling handle operatively associated with the value actuator facilitates manual control of the valve's axial position.

3 Claims, 1 Drawing Sheet

COUPLING ADAPTER

Matter enclosed in heavy brackets [ ] appears in the original patent but forms no part of this reissue specification; matter printed in italics indicates the additions made by reissue.

BACKGROUND OF THE INVENTION

Self-sealing valved couplings are widely employed in fluid circuits to interconnect hose lines wherein the mating parts employ axial movable valves of the sliding sleeve or poppet type which utilize the relative axial movement of the coupling parts during assembly or disassembly to open or close the valves, respectively. The construction of these couplings generally include locking and release structure, such as ball release sleeve for quick connect or disconnect, and the valve in each part engages a member of the opposing part to open when connected while a compression spring biasing each valve toward the closed position causes the valves to seal automatically when disconnected.

Self-sealing valved couplings of the aforedescribed type are commonly employed in systems for automotive air conditioners, heat pump units and the like, where one part is attached to a hose line leading directly from the unit and the other part is attached to an evacuation or recharging line. Maintenance or serving of the units require that the couplings be disconnected and connected under high pressure, and disconnection of the parts is relatively easy. However, as the coupling and uncoupling of the parts controls the valve operation the parts are extremely difficult to connect under high pressure due to the internal pressure impose on the valve. Also, the situation may arise, such as during servicing, where the technician may want to control the flow of fluid in the coupling under partial flow conditions and as the valves fully open during coupling and are not capable of being manually controlled this is not possible.

It is therefore an object of the invention to provide a coupling servicing adapter to be used with self-sealing valved coupling parts of the axially movable type wherein the adapter employs a manually operable valve actuator for axially displacing the associated coupling part's valve to the open and closed condition with relatively little effort.

Another object of the invention is to provide a coupling servicing adapter to be used with self-sealing valved coupling parts of the axially movable type wherein the adapter may be used to selectively displace the value between the open and closed conditions for controlling fluid flow in the coupling part.

A further object of the invention is to provide a coupling servicing adapter to be used with self-sealing valved coupling parts of the axially movable type wherein the adapter employs a threaded valve actuator for axially displacing the valve by rotation of a torque applying handle whereby the threaded action multiplies the effective forces used to displace the valve when under high pressure.

An additional object of the invention is to provide a coupling servicing adapter for use with self-sealing valved coupling parts wherein the adapter is readily coupled and uncoupled to the part and is connectable to an evaluation or recharging line.

In the practice of the invention the coupling servicing adapter includes a tubular body having an outer end and a coupling end for coupling with a self-sealing valved coupling part of the type which employs an axially displaceable valve. An axial passage extends through the body from the coupling end and intersects an axially aligned threaded bore formed in the outer end wherein the threaded end of a valve actuator is received. The other end of the valve actuator is located in the passage and is adapted to releasably engage and displace the associated part's valve by rotation of a handle disposed adjacent the body outer end. A tubular extension transversely disposed to the body includes a fluid port intersecting the body passage and is attachable to an evaluation or recharging line.

The valve actuator carries an 0-ring seal mounted adjacent the free end adapted to engage a conical valve seat when the handle is rotated to a valve disengage or closed position sealing the passage and another 0-ring seal mounted on the actuator intermediate the free end and threaded end maintains a sealing relationship adjacent the intersection of the bore and passage.

Preferably the handle is rotated to the close condition prior to connecting the adapter to the part to prevent the actuator from engaging the valve during connection. The adapter is connected to the coupling part by standard interconnecting means defined on the adapter adjacent the coupling end. Once coupled, rotation of the handle in the opening direction engages the valve actuator with the coupling part's valve, and as rotation continues the valve is axially displaced to the open condition placing the coupling part in fluid communication with the adapter.

As the displacement of the self-sealing valve is independent of the coupling action, the adapter may be easily coupled to the coupling part under high pressure conditions whereby the threading action of the valve actuator multiplies the effective forces used to displace the valve. Also, as the valve actuator controls the axial position of the self-sealing valve fluid flow in the coupling adapted can be controlled manually by selective rotation of the handle.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
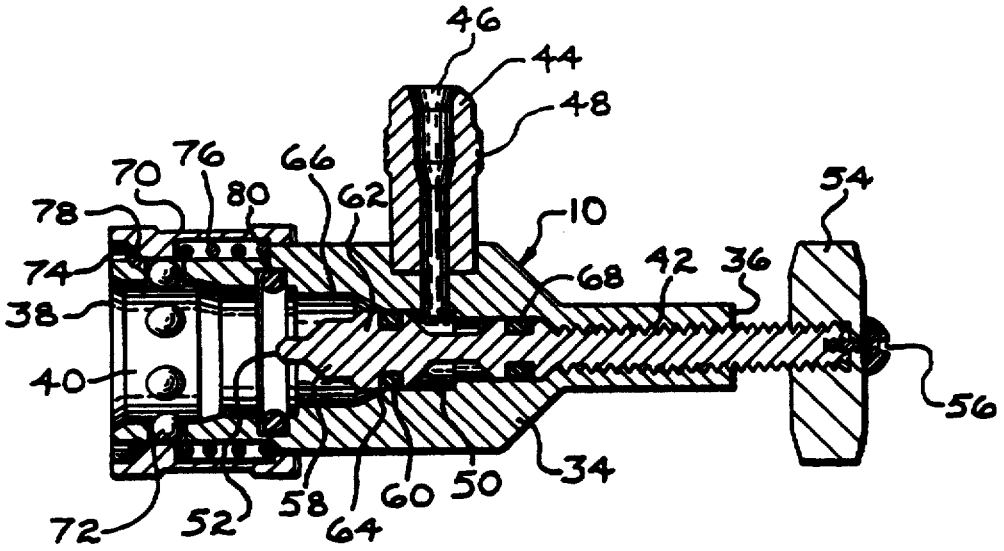
FIG. 1 is an elevational, diametrical, sectional view of a coupling servicing adapter constructed in accord with the invention showing the valve actuator in the closed or valve disengaged position.

The coupling adapter in accord with the invention will be appreciated from the drawing figures. The coupling adapter 10 is adapted for use with self-sealing valved coupling parts utilizing axially movable valves whereby the adapter 10 employs a manually operable valve actuator for controlling the axial position of the associated part's valve.

Figure 2:
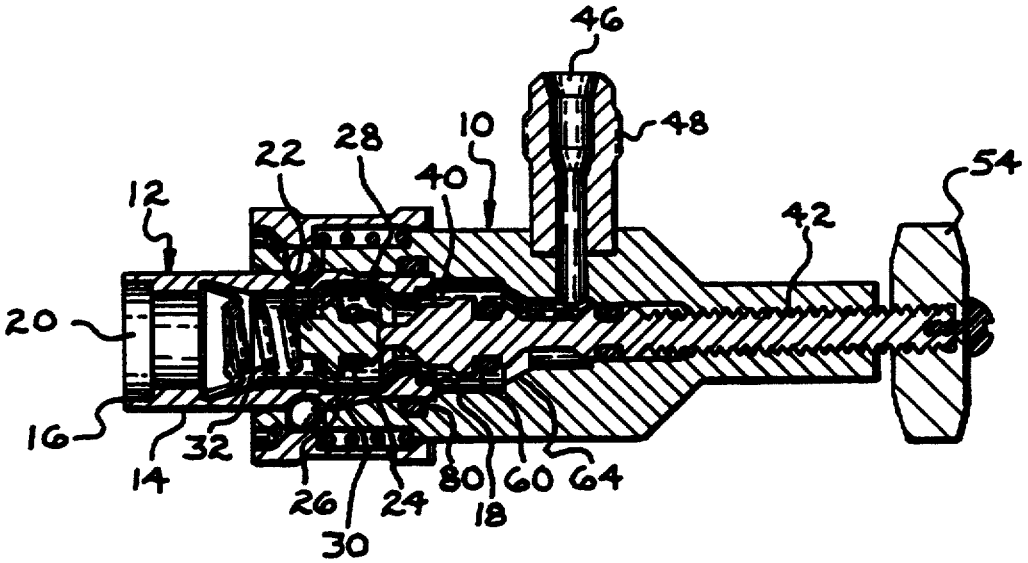
FIG. 2 is an elevational, diametrical, sectional view of the coupling adapter of FIG. 1 as coupled to a self-sealing valved coupling part showing the valve actuator in the open or valve engaged position displacing the self-sealing valve to the open position.

In FIG. 2 a typical example of a self-sealing valved coupling part with which the adapter of the invention may be employed is shown at 12 and is described in the assignee's application U.S. Ser. No. 07/269,729 filed Nov. 10, 1988. The part 12 has a tubular body 14 which includes an attachment end 16 for connecting to a hose line, such as may exist in an automotive heat pump or air conditioner unit, and an extension end 18 for connecting to another coupling part or the adapter of the invention. An axial passage 20 extends through the body wherein a self-sealing valve assembly is located comprising a spring biased cylindrical valve 22 axially movable in the passage 20 between open and closed positions. The valve 22 carries a sealing ring 24 adjacent a maximum diameter step 26 which engages a valve seat 28 when the valve is in the closed position, and the step 26 concentrically aligns with a maximum diameter recess 30 when the valve is in the fully open position as shown in FIG. 2. The valve 22 is normally forced to the closed position by the action of a spring 32 sealing the passage 20.

The adapter 10 of the invention includes a tubular body 34 having an outer end 36 and a coupling end 38 adapted to connect to the coupling part 12. An axial passage 40 extends from the coupling end 38 and intersects an axially aligned threaded bore 42 formed in the outer end 36 intermediate the body ends 36 and 38. A tubular extension 44 transversely disposed to the body 34 includes a fluid port 46 intersecting the passage 40 and an annular shoulder 48 for attaching to a test line or to an evacuation or charging line, not shown.

The threaded bore 42 receives a threaded valve actuator 50 having a free end 52 located in the passage 40 adapted to releasably engage and displace the valve 22. The free end 52 is axially displacement in the passage 40 between a valve engaging or open position, FIG. 2, and a closed or valve disengage position FIG. 1 by rotation of a handle 54 disposed adjacent the outer end 36. The handle 54 is mounted to the treaded end of the actuator by a screw 56.

An annular shoulder 58 is defined on the actuator 50 adjacent the free end 52 and carries an annular sealing ring 60 adjacent a maximum diameter step 62. The seal 60 establishes a sealing relationship with a conical valve seat 64 adjacent recess 66 when the handle is rotated to the closed position of FIG. 1, whereby rotation of the handle is limited by engagement of the step 62 with the seat 64. Another sealing ring 68 axially spaced from the shoulder 58 maintains a sealing relationship adjacent the intersection of the passage 40 and the bore 42 whether the valve actuator is in the closed or open position.

A latch sleeve 70 is slidably mounted on the coupling end displaceable between release and lock positions for coupling the adapter 10 to the part 12. The sleeve 70 supports radially displaceable detent balls 72 and has a counterbore 74 that frees the balls 72 when the sleeve is in the release position. A spring 76 interposed between the body 34 and sleeve 70 normally biases the sleeve to the lock position as shown in FIG. 2 whereby an annular ring 78 limits movement thereof and contains the balls in the counter bore when the sleeve is in the release position. A sealing 0 ring 80 disposed on the interior diameter of the body 34 establishes a sealing relationship with the outer surface of the part 12.

Prior to connecting the adapter 10 to the part 12 the handle is rotated to the closed condition of FIG. 1 to prevent the actuator from engaging the valve 22 during coupling.

To connect the adapter 10 to the coupling part 12 it is merely necessary to insert the extension end 18 into the coupling end 38. By holding the adapter 10 in one hand and pulling the sleeve 70 in an axial direction away from the end 38 the balls 72 may be displaced radially. Sliding the coupling end 38 continues over the coupling part's extension end 18 until movement is limited and release the sleeve 70 occurs, whereupon the stressed spring 76 retracts closing the sleeve and causing the detent balls 72 to engage in a recess defined on the coupling part's body coupling the adapter 10 and par 12 together.

Once coupled, the valve actuator may be used to manually control the axial displacement of the valve 22 and thereby the fluid flow through the coupling part and adapter by rotation of the handle. Rotation of the handle toward the open position of FIG. 2 draws the free end into engagement with the valve 22, and as rotation continues the axial displacement of the valve and actuator disengages the seals 24 and 60 with the seats 28 and 64, respectively, placing the passages 20 and 40 in fluid communication. Maximum fluid flow in the coupling part may be achieved by rotating the handle to the fully open position as illustrated in FIG. 2 whereby the steps 62 and 26 align with maximum diameter recess 66 and 30, respectively.

To disconnect the adapter from the coupling part the handle 54 may be either in the open or closed position and the sleeve 70 is moved in an axial direction away from the part 12 and at the same time pulling the adapter in the same direction will disengage the balls 72 uncoupling the body parts.

The fact that the valve 22 is not displaced until the handle is threaded toward the valve permits the adapter to be easily connected to the part even when the part is under high pressure, whereby the threading action of the valve actuator multiplies the effective forces used to displace the valve.

It should be noted that although the adapter disclosed is illustrated with a coupling part employing a poppet type valve, the inventive concepts of the invention are not limited to just poppet type valve couplings, but may be incorporated to be used with coupling parts employing sleeve or other types of axially moveable valves as well.

It is appreciated that various modifications to the inventive concepts may be apparent to those skilled in the art without departing from the spirit and scope of the invention.

We claim:

1. A coupling adapter for use with a self-sealing valve coupling part having an axially movable valve normally forced to the closed position by a spring member characterized by its ability to selectively control the axial position of the coupling part's valve when under high pressure, comprising, in combination, a tubular body having a coupling end and an outer end, quick-connect coupling means defined on said body adjacent said coupling end for selectively coupling said body and the coupling part in coaxial communication, said coupling means comprising an axially displacement sleeve defined on said body operatively associated with a plurality of radially displaceable detents defined on said body, an axial passage defined in said body extending from said coupling end intersecting an axially aligned threaded bore formed in said outer end intermediate said ends, said passage including an enlarged cylindrical portion adjacent said coupling end and a concentric reduced diameter cylindrical portion adjacent said enlarged portion, a manually operable valve actuator having a threaded end received in said threaded bore and a head axially displacement between said enlarged and reduced diameter portions adapted to releasably engage and axially displace the coupling part's valve, said head including a cylindrical portion receivable within said passage reduced diameter portion, and annular seal mounted on said head cylindrical portion sealing engaging said passage reduced diameter portion when said head cylindrical portion is received therein, a torque applying handle mounted on said valve actuator for rotating said actuator and manually controlling the axial position of the coupling part valve, first sealing means mounted on said actuator intermediate said head and said threaded end establishing a sealing relationship adjacent the intersection of said threaded bore and said passage, and a tubular extension mounted on said body transversely disposed to said body passage having a fluid port intersecting said body passage.

*2. A quick disconnect coupling for an access valve, comprising:*

*a housing, having a first end, a second end, a central passage having an axis running from said first end of said housing to said second end of said housing, a conduit opening communicating with said central passage, an inlet located in said second end of said housing, and ball bearing cavities spaced about a circumference of said inlet;*

*a depressor, having a first end and a second end, being mounted for longitudinal movement in said central passage of said housing so that said first end and said second end of said depressor are respectively in coaxial juxtaposition to said first end and said second end of said housing, said depressor being movable between an open position permitting communication through said central passage and a closed position where communication through said central passage is blocked;*

*a conduit for supplying a fluid in communication with said central passage of said housing; and*

*quick disconnect means for coupling and uncoupling the quick disconnect coupling to the access valve; and*

*means for moving said depressor between said open and said closed position, independent of said quick disconnect means.*

*3. A quick disconnect coupling according to claim 2, wherein said quick disconnect means comprises:*

*a sliding sleeve, slidably fixed about an outer surface of said second end of said housing, having an inner surface, and a closing surface and a release zone located on said inner surface of said sliding sleeve, said sliding sleeve being slidable between locked and unlocked positions, said closing surface of said sliding sleeve overlying said ball bearing cavities when said sliding sleeve is in said locked position, and said release zone overlying said ball bearing cavities when said sliding sleeve is in said unlocked position; and*

*ball bearings, retaining in said ball bearing cavities, so that when said sliding sleeve is in said locked position, said closing surface of said sliding sleeve contacts said ball bearings, forcing said ball bearings to extend into said central passage at said second end of said housing to lock the coupling to the access valve, and when said sliding sleeve is in said unlocked position, said ball bearings are free to release the coupling from the access valve.*

* * * * *